(12) United States Patent
Berger

(10) Patent No.: US 7,844,906 B2
(45) Date of Patent: Nov. 30, 2010

(54) MULTI-MODE COMMUNICATION APPARATUS AND INTERFACE FOR CONTACTING A USER

(75) Inventor: Kelly D. Berger, Milpitas, CA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 11/504,205

(22) Filed: Aug. 14, 2006

(65) Prior Publication Data

US 2009/0144634 A1 Jun. 4, 2009

Related U.S. Application Data

(62) Division of application No. 10/611,027, filed on Jun. 30, 2003, now Pat. No. 7,117,445.

(51) Int. Cl.
*G06F 3/00* (2006.01)
(52) U.S. Cl. .................................... 715/747
(58) Field of Classification Search ............... 715/797
See application file for complete search history.

(56) References Cited

U.S. PATENT DOCUMENTS

| | | | |
|---|---|---|---|
| 5,159,592 A | | 10/1992 | Perkins |
| 5,513,126 A | * | 4/1996 | Harkins et al. .............. 709/228 |
| 5,546,447 A | | 8/1996 | Skarbo et al. ......... 379/93.23 X |
| 5,559,800 A | | 9/1996 | Mousseau et al. |
| 5,579,472 A | | 11/1996 | Keyworth et al. ........... 345/751 |
| 5,594,910 A | | 1/1997 | Filepp et al. |
| 5,657,461 A | * | 8/1997 | Harkins et al. .............. 715/733 |
| 5,715,387 A | | 2/1998 | Barnstijin et al. |
| 5,727,159 A | | 3/1998 | Kikinis |
| 5,727,202 A | | 3/1998 | Kucala |
| 5,778,176 A | | 7/1998 | Geihs et al. |
| 5,790,974 A | | 8/1998 | Tognazzini |
| 5,796,394 A | * | 8/1998 | Wicks et al. ................ 715/751 |
| 5,802,312 A | | 9/1998 | Lazaridis et al. |
| 5,862,325 A | | 1/1999 | Reed et al. |
| 5,915,095 A | | 6/1999 | Miskowiec |
| 5,961,590 A | | 10/1999 | Mendez et al. |
| 5,964,830 A | | 10/1999 | Durrett |
| 6,023,708 A | | 2/2000 | Mendez et al. |
| 6,035,339 A | | 3/2000 | Agraharam et al. |
| 6,047,053 A | | 4/2000 | Miner et al. |

(Continued)

FOREIGN PATENT DOCUMENTS

| WO | WO 98/36344 | 8/1998 |
|---|---|---|
| WO | WO 00/30003 | 5/2000 |

OTHER PUBLICATIONS

Excite Home Page, http://www.excite.com/, 1 page Aug. 1, 2000.

(Continued)

*Primary Examiner*—Ryan F Pitaro

(57) ABSTRACT

A method implemented on a data processing device is described comprising: receiving an incoming electronic message having an identifiable sender address; querying data storage to determine if the sender address is a known sender address; if the sender address is a known sender address, then automatically retrieving alternate contact information associated with the sender address; and automatically generating an interface containing the alternate contact information, the interface accessible by the user of the data processing device.

15 Claims, 11 Drawing Sheets

U.S. PATENT DOCUMENTS

| | | | |
|---|---|---|---|
| 6,057,841 | A | 5/2000 | Thurlow et al. |
| 6,076,093 | A | 6/2000 | Pickering ................ 345/733 X |
| 6,076,109 | A | 6/2000 | Kikinis |
| 6,134,566 | A | 10/2000 | Berman et al. |
| 6,151,677 | A | 11/2000 | Walter et al. |
| 6,157,935 | A | 12/2000 | Tran et al. |
| 6,157,945 | A * | 12/2000 | Balma et al. ................ 709/206 |
| 6,166,734 | A | 12/2000 | Nahi et al. |
| 6,167,441 | A | 12/2000 | Himmel |
| 6,199,099 | B1 | 3/2001 | Gershman et al. |
| 6,208,719 | B1 * | 3/2001 | Lo et al. ................ 379/114.03 |
| 6,266,400 | B1 | 7/2001 | Castagna ............... 379/88.2 X |
| 6,282,435 | B1 | 8/2001 | Wagner et al. .............. 455/566 |
| 6,286,063 | B1 | 9/2001 | Bolleman et al. |
| 6,330,618 | B1 | 12/2001 | Hawkins et al. |
| 6,336,137 | B1 | 1/2002 | Lee et al. |
| 6,370,687 | B1 | 4/2002 | Shimura |
| 6,396,482 | B1 | 5/2002 | Griffin et al. |
| 6,418,310 | B1 | 7/2002 | Dent |
| 6,438,601 | B1 | 8/2002 | Hardy |
| 6,526,274 | B1 | 2/2003 | Fickes et al. ............ 455/413 X |
| 6,546,005 | B1 * | 4/2003 | Berkley et al. .............. 370/353 |
| 6,622,175 | B1 | 9/2003 | Piller |
| 6,636,888 | B1 | 10/2003 | Bookspan et al. |
| 6,640,230 | B1 | 10/2003 | Alexander et al. |
| 6,771,756 | B1 | 8/2004 | Chou et al. |
| 6,798,753 | B1 | 9/2004 | Doganata et al. |
| 6,968,216 | B1 * | 11/2005 | Chen et al. ................ 455/567 |
| 6,988,128 | B1 | 1/2006 | Alexander et al. |
| 7,010,292 | B2 * | 3/2006 | Jerbi et al. .............. 455/414.1 |
| 7,010,599 | B2 * | 3/2006 | Shrinivasan et al. ......... 709/225 |
| 7,043,205 | B1 * | 5/2006 | Caddes et al. .............. 455/41.2 |
| 7,330,895 | B1 * | 2/2008 | Horvitz ..................... 709/227 |
| 7,409,233 | B2 * | 8/2008 | Pritchard ................... 455/567 |
| 7,545,525 | B2 * | 6/2009 | Idehara ..................... 358/1.15 |
| 2002/0007454 | A1 | 1/2002 | Tarpenning et al. |
| 2002/0010757 | A1 | 1/2002 | Granik et al. |
| 2002/0032040 | A1 * | 3/2002 | Tsukamoto ................ 455/556 |
| 2002/0075305 | A1 | 6/2002 | Beaton et al. .............. 345/751 |
| 2003/0013483 | A1 | 1/2003 | Ausems et al. |
| 2003/0224814 | A1 * | 12/2003 | Qu et al. .................... 455/517 |
| 2004/0132438 | A1 * | 7/2004 | White ....................... 455/418 |
| 2004/0203766 | A1 * | 10/2004 | Jenniges et al. .......... 455/435.1 |
| 2004/0235520 | A1 | 11/2004 | Cadiz et al. ................. 455/557 |
| 2008/0140776 | A1 * | 6/2008 | Horvitz ..................... 709/204 |
| 2009/0003569 | A1 * | 1/2009 | Forbes et al. ........... 379/142.07 |
| 2009/0116403 | A1 * | 5/2009 | Callanan et al. ............. 370/254 |

OTHER PUBLICATIONS

Alta Vista Home Page, http://www.altavista.com/, 1 Page Aug. 1, 2000.

Yahoo Home Page, http://www.yahoo.com/, 1 page Aug. 1, 2000.

Anita Komlodi, Key Frame Preview Techniques for Video Browsing, Digital Library Research Group, College of Library and Information Services University of Maryland, pp. 118-125.

Appenzeller, et al.., "User-friendly Access Control For Public Network Ports", IEEE, pp. 699-707, Mar. 1999.

"Multimedia Telephone Caller Recognition", IBM Technical Disclosure Bulletin, vol. 34 No. 10A, Mar. 1992, pp. 315-316.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting to Network And Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet To Information Appliances 1999 IEEE Global Telecommunications Conference" Globecom 1999, Seamless Interconnection for Universal Services, vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference On World Wide Web, May 11, 1999, pp. 1-14, XP002163485.

"CC/PP Attribute Vocabularies" W3C Jul. 21, 2000, XP002218349.

"Non Final Office Action", U.S. Appl. No. 10/611,019, 12 pages.

"Final Office Action", U.S. Appl. No. 10/611,019, (Jul. 9, 2009),8 pages.

* cited by examiner

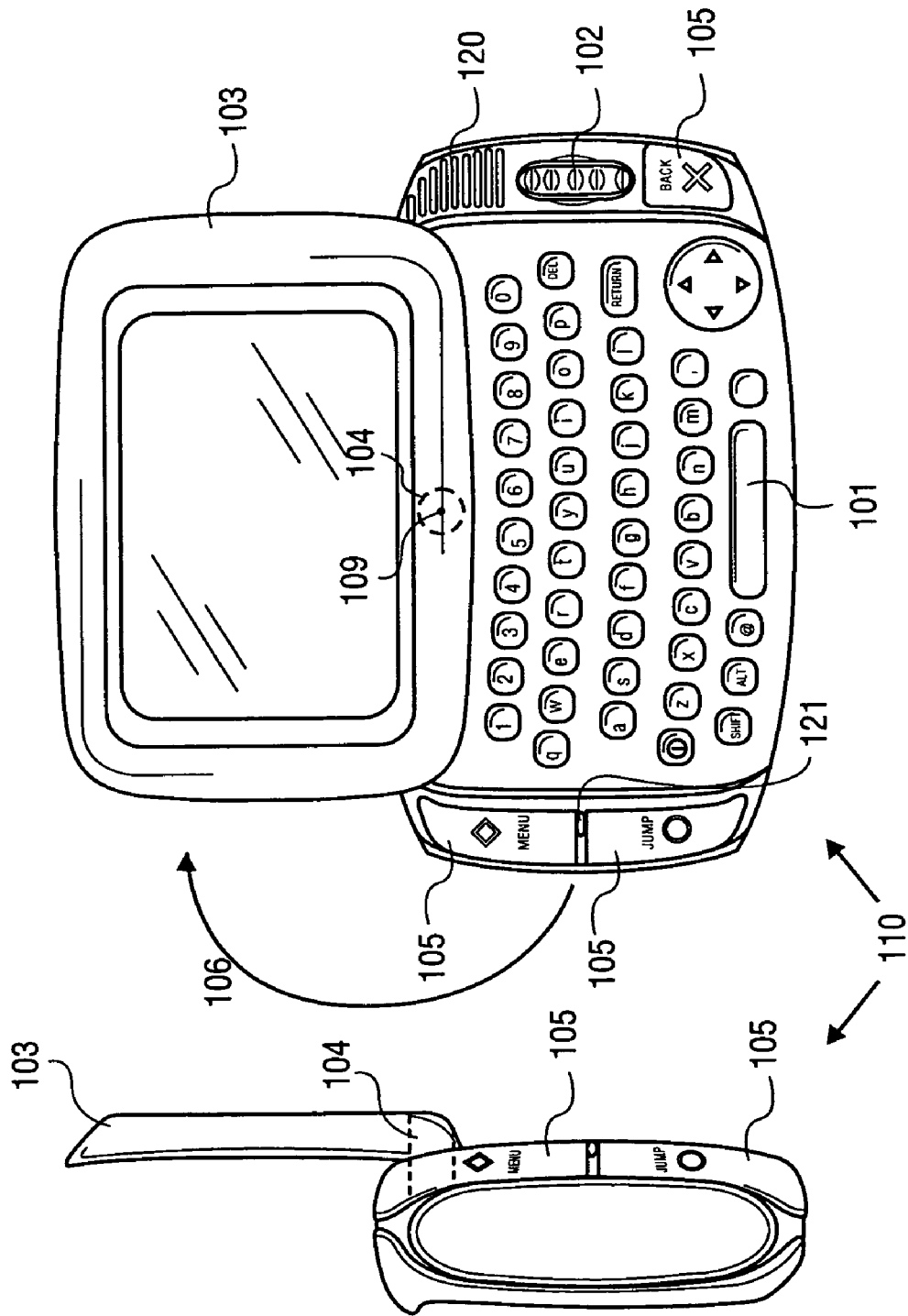

MULTI-MODE COMMUNICATION APPARATUS AND INTERFACE FOR CONTACTING A USER

CLAIM TO PRIORITY

This application is a divisional of prior application Ser. No. 10/611,027, filed Jun. 30, 2003 now U.S. Pat. No. 7,117, 445.

TECHNICAL FIELD

This application relates generally to the field of data processing systems, and more particularly to providing multiple options for contacting a user.

BACKGROUND

Electronic messaging applications such as email and instant messaging and personal information management ("PIM") applications such as electronic calendars and address books have become irreplaceable tools in today's business environment. Virtually all corporate employees rely on electronic messaging applications and PIM applications in one form or another. In addition, a growing number of users rely on portable, multi-purpose telephony devices which include both electronic messaging and PIM capabilities. Once such device is the Hiptop™ communicator designed by Danger, Inc., and distributed by T-Mobile, Inc.

One limitation of current multi-purpose telephony devices is that the different messaging and PIM applications do not interact with one another to exchange information in a useful manner. For example, although the user's address book may contain a variety of communication channels for contacting other users, no mechanism exists for automatically proving this information to the user when the user is working within a different application (e.g., within the email application). Such interaction would be useful in a variety of circumstances. For example, when the user receives a new email message, it would be beneficial to provide the user with a list of alternate communication channels for the sender of the email message (e.g., telephone number, instant messaging address, . . . etc).

Accordingly, what is needed is an improved suite of PIM/messaging applications. What is also needed is a suite of PIM/messaging applications which interact together in a variety of useful ways. What is also needed is an interface which provides context-sensitive options for contacting a user from within PIM/messaging applications.

SUMMARY

A method implemented on a data processing device is described comprising: receiving an incoming electronic message having an identifiable sender address; querying data storage to determine if the sender address is a known sender address; if the sender address is a known sender address, then automatically retrieving alternate contact information associated with the sender address; and automatically generating an interface containing the alternate contact information, the interface accessible by the user of the data processing device.

BRIEF DESCRIPTION OF THE DRAWINGS

A better understanding of multi-mode communication apparatus and interface for contacting a user can be obtained from the following detailed description in conjunction with the following drawings, in which:

FIGS. 1b-d illustrates an exemplary data processing device on which embodiments of the invention may be implemented.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Embodiments of the invention may be implemented on a wireless device 110 which communicates with a data processing service 100 as illustrated generally in FIG. 1. Embodiments of a service 100 and data processing device 110 are described in co-pending application entitled NETWORK PORTAL SYSTEM, APPARATUS AND METHOD, Ser. No. 09/714,897, filed Nov. 15, 2000, and SYSTEM AND METHOD FOR INTEGRATING PERSONAL INFORMATION MANAGEMENT AND MESSAGING APPLICATIONS, Ser. No. 10/262,298, filed Sep. 30, 2002 (hereinafter "co-pending applications"), which are assigned to the assignee of the present application and which are incorporated herein by reference. Certain features of the service 100 and an exemplary data processing device 110 will now be described followed by a detailed description of a multi-mode communication interface for contacting a user and a system and method for dynamically managing presence and contact information. It should be noted, however, that the specific data processing device and system architecture described in the co-pending applications are not required for implementing the underlying principles of the invention. Rather, the embodiments of the invention described below may be implemented on virtually any type of data processing device including standard personal computers, personal digital assistants and wireless telephones.

Figure 1A:
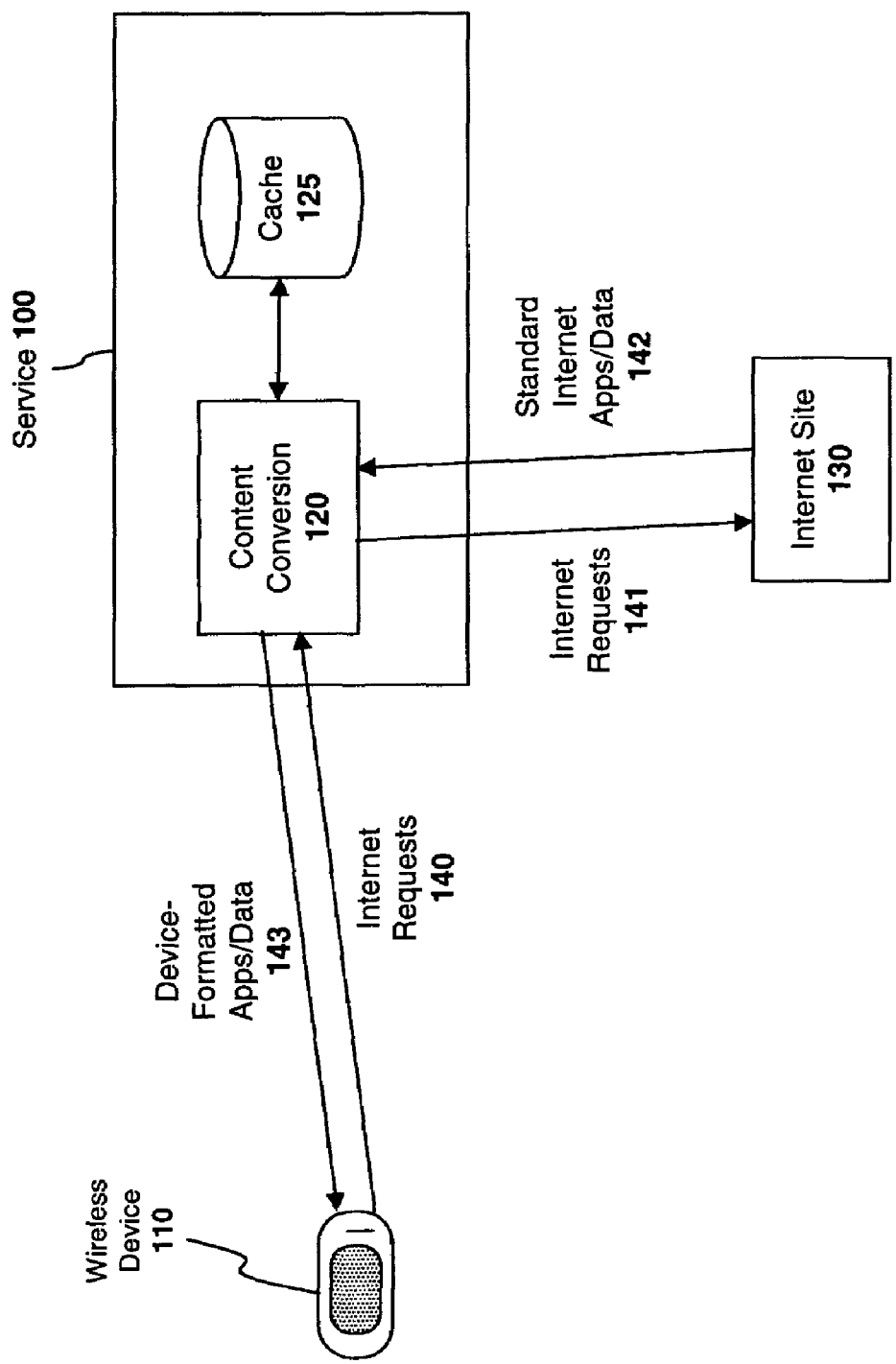
FIG. 1a illustrates a service communicating with a data processing device according to one embodiment of the invention.

In one embodiment, the service 100 converts standard applications and data into a format which each data processing device 110 can properly interpret. Thus, as illustrated in FIG. 1a, one embodiment of the service 110 includes content conversion logic 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 124 into a format which the data processing device 110 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 110. As described above, in one embodiment, the bytecodes may be Java bytecodes/applets. However, the conversion logic 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

An Exemplary Data Processing Device

Figure 1B:
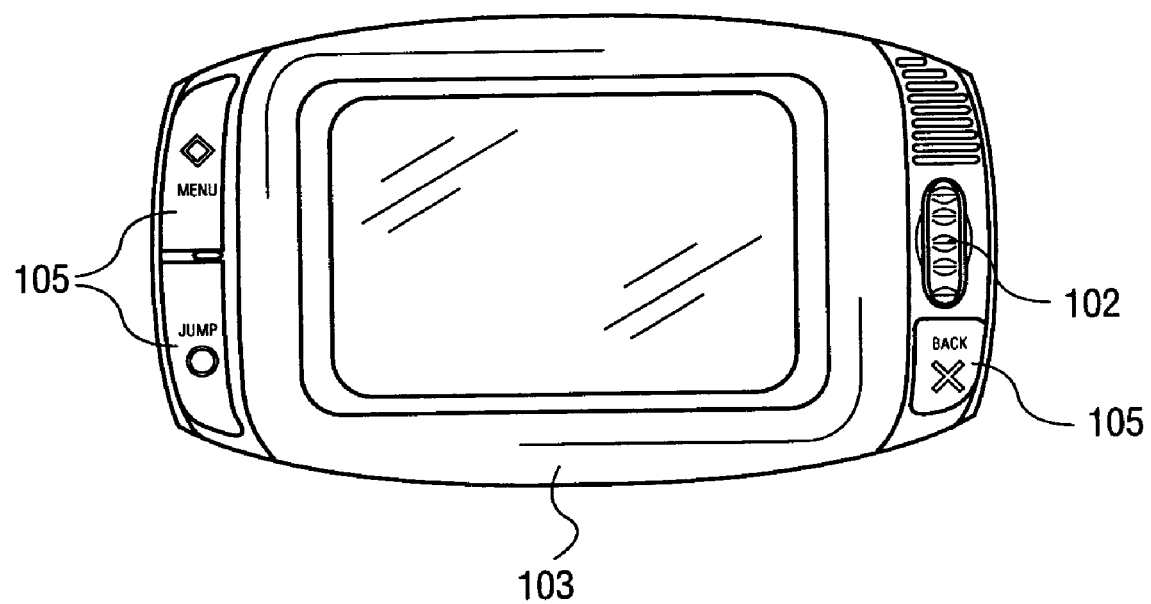

An exemplary data processing device on which embodiments of the invention are implemented is illustrated in FIGS. 1*b*-*d*. The data processing device 110 includes a keyboard 101, a control knob/wheel 102 (e.g., for scrolling between menu items and/or data), and a set of control buttons 105 (e.g., for selecting menu items and/or data).

The display 103 is pivotally coupled to the data processing device 110 and pivots around a pivot point 109, located within a pivot area 104, from a first position illustrated in FIG. 1*b* to a second position illustrated in FIGS. 1*c*-*d*. When in the first position the display 103 covers the keyboard 101, thereby decreasing the size of the device 110 and protecting the keyboard 101. Even when the display is in the first position, however, the control knob 102 and control buttons 105 are exposed and therefore accessible by the user. The motion of the display 103 from the first position to a second position is indicated by motion arrow 106 illustrated in FIGS. 1*b*-*c*. As illustrated, when in the second position, the keyboard 101 is fully exposed. Accordingly, the display is viewable, and data is accessible by the user in both a the first position and the second position (although access to the keyboard is only provided in the first position).

In one embodiment, the data processing device 110 is also provided with audio telephony (e.g., cellular) capabilities. To support audio telephony functions, the embodiment illustrated in FIGS. 1*b*-*d* includes a speaker 120 for listening and a microphone 121 for speaking during a telephone conversation. Notably, the speaker 120 and microphone 121 are positioned at opposite ends of the data processing device 110 and are accessible when the screen 103 is in a closed position and an open position.

Application Linking

Figure 2:
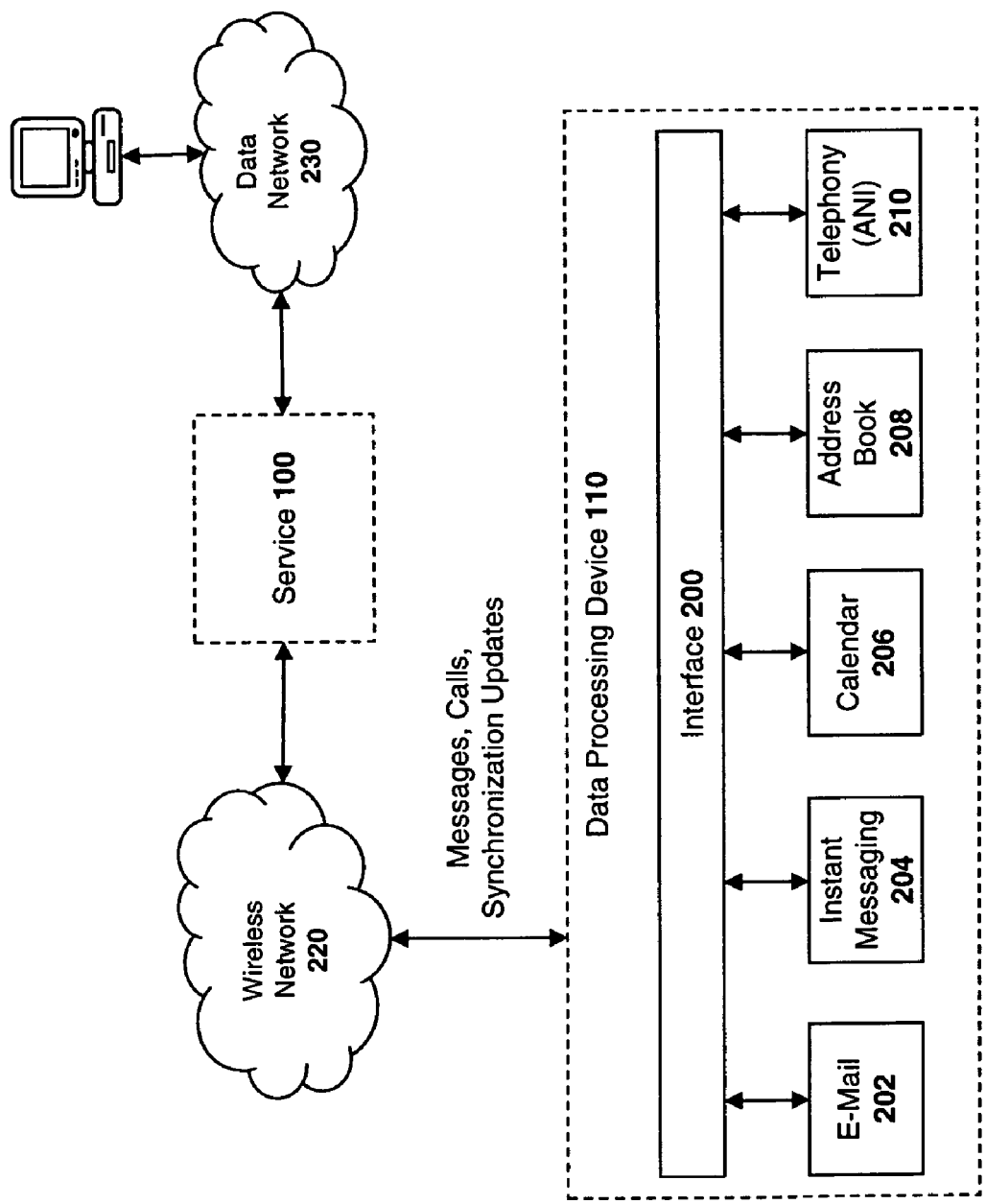
FIG. 2 illustrates one embodiment of a system for linking personal information management and messaging applications.

As illustrated in FIG. 2, a plurality of PIM and messaging applications may be executed on the data processing device 110 including, but not limited to, an e-mail client 202, an instant messaging client 204, an electronic calendar 206, an electronic address book 208 and a telephony module 210 for providing two-way audio communications via a wireless network 220. As indicated in FIG. 2, the telephony module 210 may employ automatic number identification ("ANI") techniques for identifying incoming callers.

In one embodiment of the invention, the PIM and messaging applications 202-210 executed on the data processing device 110 interact with one another through an application interface 200 (e.g., in the various ways set forth below). Although the interface 200 is illustrated within the data processing device 110 in FIG. 2, certain functions performed by the interface 200 may be executed on the service 100.

In one embodiment, the address book 208 acts as a central repository for contact information. Thus, any time a user enters new contact data from within any of the applications, the contact data is stored by the address book application 208. For example, when the user enters a new email address or a new instant messaging "buddy" to his/her buddy list, the new address/buddy is automatically stored within the address book. Alternatively, in one embodiment, a central data repository for contact information is maintained on the data processing device 110 (e.g., a central database) and is directly accessible by each of the PIM/messaging applications 202-210 including but not limited to the address book application 208. The underlying principles of the invention remain the same regardless of how the contact information is stored and managed on the data processing device 110 and/or the service 100.

Multi-Mode Communication

Figure 3A:
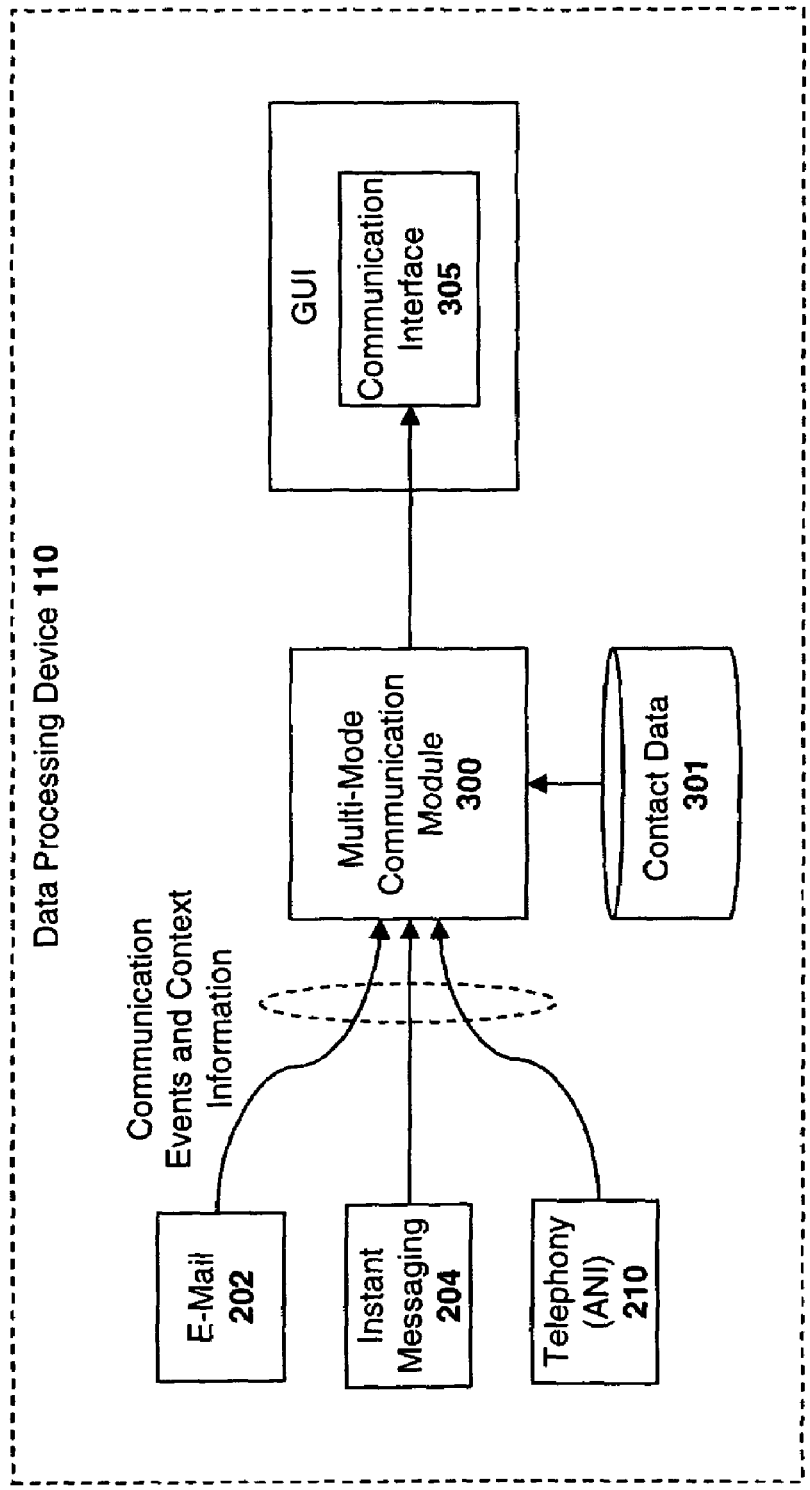
FIG. 3a illustrates one embodiment of a multi-mode communication interface for contacting a user.

One embodiment of the invention allows the user of the data processing device 110 to easily choose an appropriate communication mode (e.g., voice telephony, instant messaging, email, multimedia message service, . . . etc) based on context, and to easily switch between communication modes. As illustrated in FIG. 3*a* this embodiment includes a multi-mode communication module 300 for generating a communication interface 305 using the contact data 301 stored on the data processing device. In one embodiment, the communication interface includes a list of communication options for contacting a particular message originator or caller. The list of communication options may include all the available ways in which the user of the data processing device 110 may respond to the originator a highlighted email message, instant message or an incoming telephone call.

As illustrated in FIG. 3*a*, in one embodiment, the multi-mode communication module 300 generates the communication interface 305 in response to communication events and context information provided by the various communication applications (e.g., the email client 202, the instant messaging client 204, the voice telephony module 210, . . . etc). By way of example, and not limitation, communication events may include the receipt of a new email message, a new instant message, an incoming telephone call, or any other type of information indicating the current communication state of the data processing device 110. The context information may include, for example, an indication as to which applications are currently active, the current state of the active applications (e.g., which messages are highlighted within the active applications) and/or the current online status of the user (e.g., whether the user is logged in to an email application or listed as "online" for an instant messaging session).

Figure 4A:
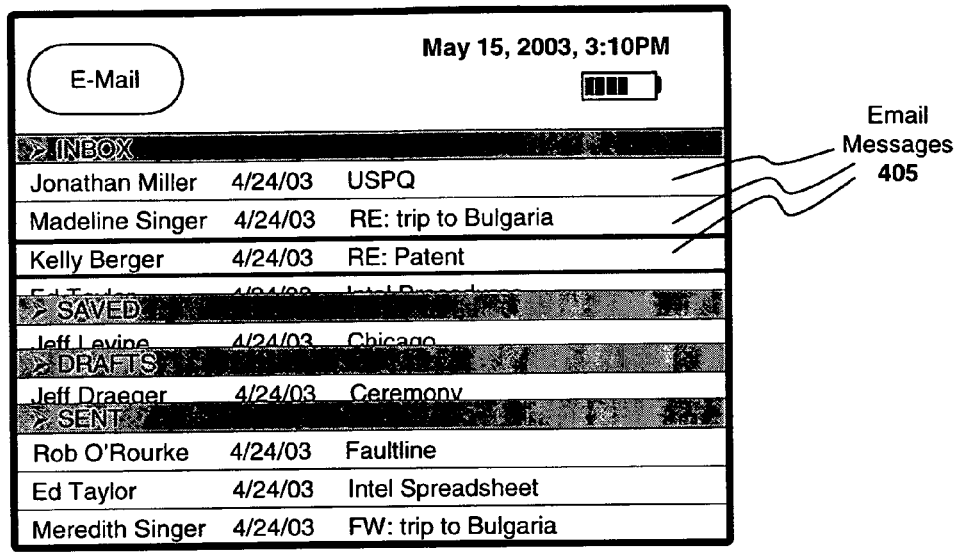
FIGS. 4a-b illustrate one embodiment of a multi-mode interface for contacting a user.
Figure 4B:
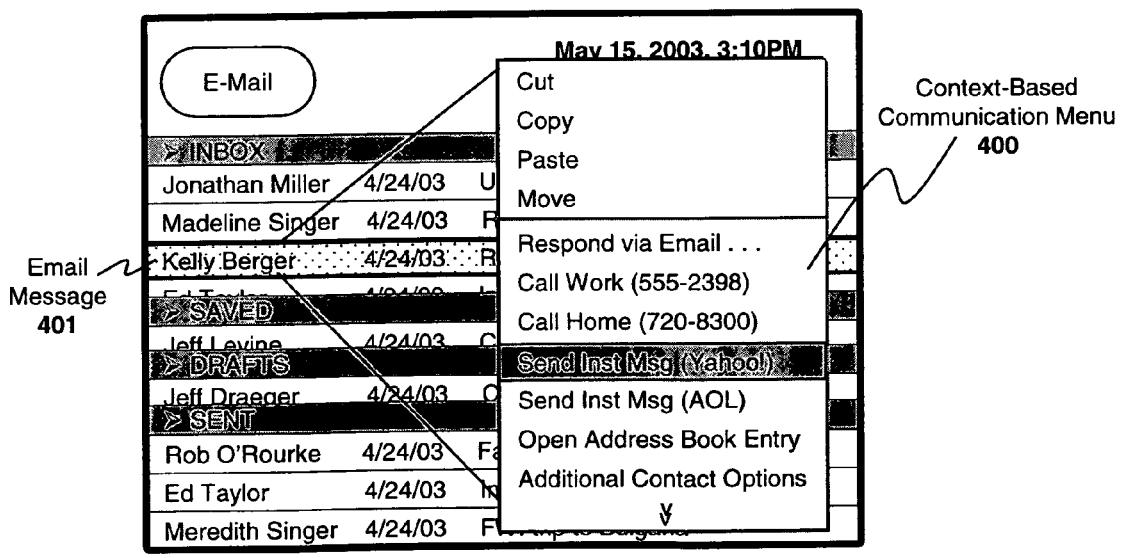

FIG. 4a illustrates an exemplary email client with a group of email messages 405 stored in the user's inbox and FIG. 4b illustrates a specific type of communication interface 305—i.e., a context-sensitive communication menu 400 generated by the multi-mode communication module 300. The communication menu 400 includes a list of options for contacting the sender of each email message. In the specific example illustrated in FIG. 4b, one particular email message 401 is highlighted and the context-sensitive communication menu 400 includes an option to "respond via email" to the sender of the highlighted email message 401; two options for calling the sender of the email message at two different numbers; two options for sending an instant message to the sender of the email message using two different instant messaging accounts; and an option to open the user's address book entry (e.g., to retrieve/review additional information related to the sender).

In addition, one entry in the context-sensitive menu provides an option for searching for "additional contact options." In one embodiment, the search for "additional contact options" includes searching for additional information related to the sender of the email on the Internet or other external network (e.g., such as searching an internet White Pages or Yellow Pages directory).

Various additional communication options may be included within the context-sensitive communication menu 400. In one embodiment, the multi-mode communication module 300 includes an option for initiating a multi-party response to a particular message. For example, one option may allow the end-user to initiate a group instant messaging chat session with all the recipients of the selected email message.

In one embodiment, the multi-mode communication module 300 generates the context-sensitive communication menu 400 in response to a specific cursor control manipulation, such as "right clicking" on the email message with a mouse or similar cursor control device or selecting a designated key from the data processing device's keyboard. In one embodiment, holding down the control knob 102 on the data processing device 110 for a specified period of time (e.g., ½ second) generates the communication menu 400. Alternatively, or in addition, the multi-mode communication module 300 may generate the context-based communication menu 400 automatically, in response to incoming communication events such as the receipt of a new email message, instant message or telephone call.

In one embodiment, the multi-mode communication module 300 builds the context-based communication menu 400 dynamically, by first identifying the originator of the incoming email message, instant message or voice telephone call (e.g., using the sender's email address, instant messaging address or phone number, respectively) and then searching the data processing device 110 to determine the alternate communication channels over which the originator may be contacted. In an embodiment in which all of the contact information is maintained by the address book application 208, the multi-mode communication module 300 may query the address book program to retrieve the contact information (e.g., via the interface 200). In another embodiment, rather than querying the address book application 208, the multi-mode communication module 300 may access the contact information directly from the data file or database in which the contact information is stored on the data processing device 110 or the service 100. Thus, in this embodiment, the address book program 208 does not need to be actively running for the multi-mode communication module 300 to gain access to the underlying contact data. As mentioned above, however, the underlying principles of the invention are not limited to any particular technique for storing and/or retrieving contact data.

In one embodiment, each of the entries within the context-based communication menu 400 identifies an appropriate communication application for contacting the sender. For example, the entries for calling the originator's "work" and "home" numbers may be associated with the voice telephony application 210 and the entries for Instant messaging may be associated with an appropriate instant messaging client 204 (e.g., a Yahoo! instant messaging client and the AOL instant messaging client). Thus, in response to a selection of one of the entries from within the communication menu 400, the appropriate application is automatically executed and initialized using the specific phone number, email address or instant messaging address associated with the entry. In this manner, the user may quickly and efficiently generate a response to the message originator.

Although described above primarily within the context of an email client, the underlying principles of the invention may be implemented within virtually any type of communication application including an instant messaging application, a voice telephony application, a short message service ("SMS") application and/or a multimedia message service ("MMS") application, to name a few. For example, when the user receives an incoming telephone call, a list of contact options may be provided, similar to the list of contact options within the communication menu 400 illustrated in FIG. 4b.

Moreover, in one embodiment, the communication menu 400 (or other type of communication interface 305) generated by the multi-mode communication module 300 is configurable by the user to provide a specified list of prioritized contact options. For example, the user may specify that, for incoming telephone calls, the multi-mode communication module 300 should provide instant messaging addresses first in the communication menu 400, thereby making them more easily accessible to the user, followed by SMS addresses and then email addresses.

In one embodiment, the multi-mode communication module 300 uses presence information from the instant messaging client (e.g., whether the message sender is logged in or logged off a particular instant messaging account) or the location associated with the sender's email address (e.g., "work" or "home") to prioritize or to include/exclude the various communication options within the communication menu 400. For example, if a user is not logged in to a particular instant messaging account, then the multi-mode communication module 300 may not include an option for that account. Moreover, in one embodiment, if the multi-mode communication module 300 determines that the email message was sent from the sender's work email account, or if the sender is logged into his/her work instant messaging account, then the multi-mode communication module 300 may prioritize the sender's work telephone number above the sender's home telephone number in the list.

Figure 5:
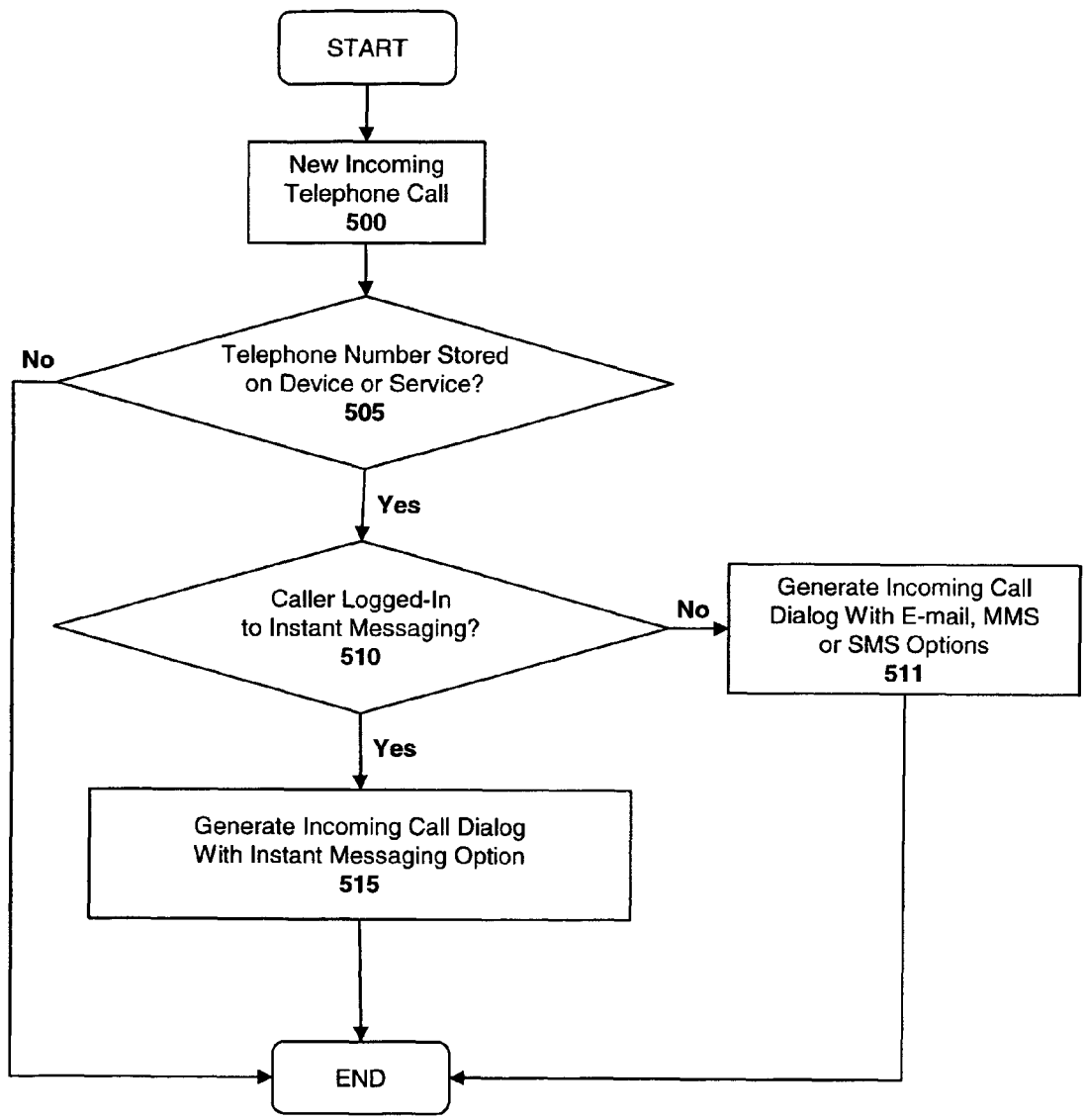
FIG. 5 illustrates one embodiment of the invention employed in conjunction with an incoming email message.

Three examples of system operation with different communication clients will now be described with respect to the flowcharts in FIGS. 5-6. Referring to FIG. 5, upon receipt of a new telephone call at 500, the data processing device initially notifies the user with an on-screen incoming call dialog, a specified sound, and/or LEDs on the data processing device. At 505, the multi-mode communication module 300 determines whether the caller's telephone number (e.g., identified using ANI techniques) is stored on the data processing device 110 (e.g., in the user's address book) or the service 100. If not, then the process terminates. If so, then at 510, the multi-mode communication module 300 retrieves any instant messaging addresses and determines whether the caller is logged in to a particular instant messaging account (if one exists). If the caller is logged in to an instant messaging account, then the multi-mode communication module 300 generates an option to send an instant message within the incoming call dialog (e.g., in the form of an "instant message" button). If the caller is not logged in to a particular instant messaging account (or if no account exists), then at 511, the multi-mode communication module 300 generates an incoming call dialog with one or more alternate communication options (e.g., email, SMS, MMS, . . . etc). Alternatively, or in addition, the multi-mode communication module 300 may simply generate a menu containing all of the possible communication channels for contacting the caller (e.g., as described above).

Figure 6:
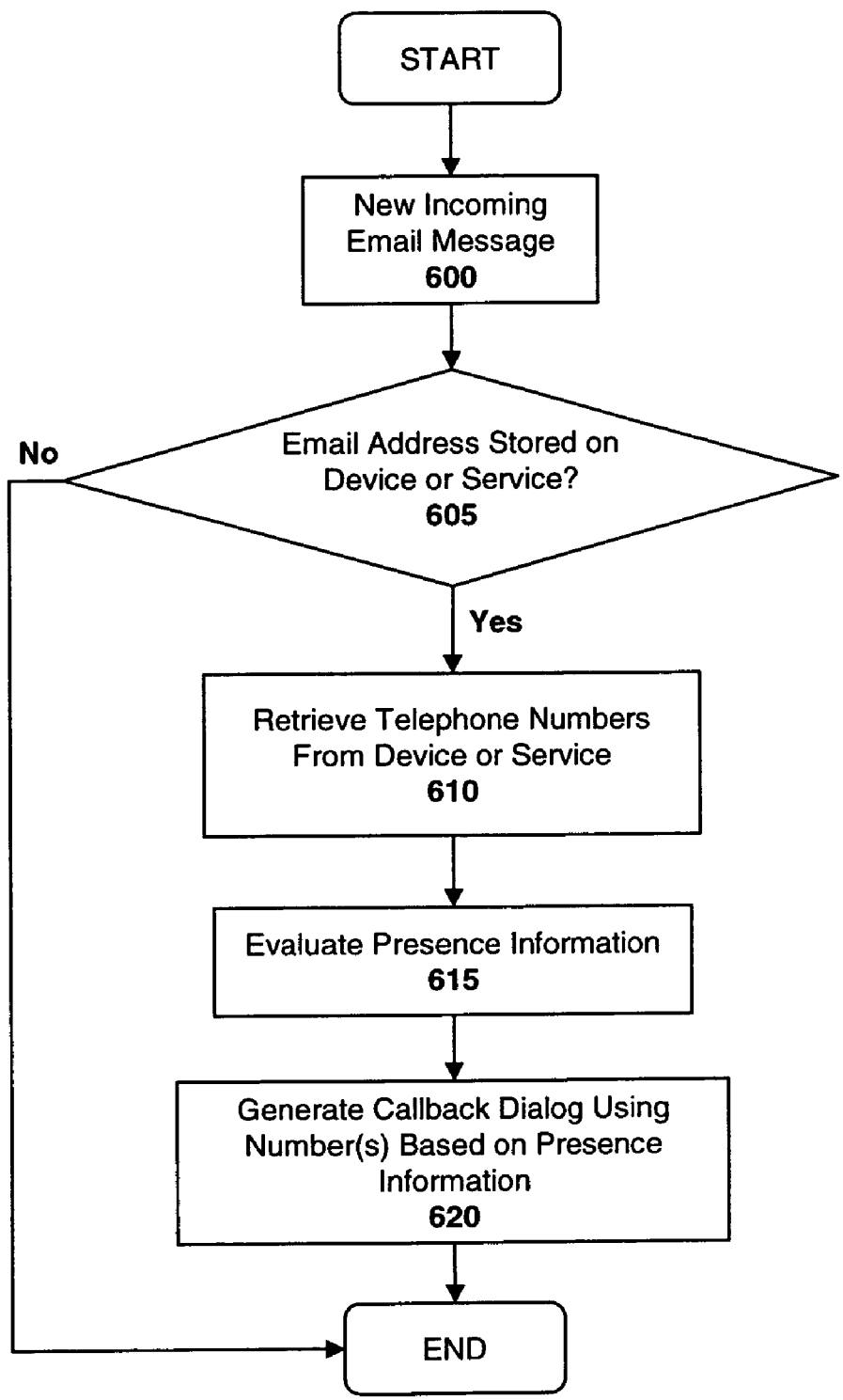
FIG. 6 illustrates one embodiment of the invention employed in conjunction with an incoming voice telephone call.

FIG. 6 illustrates one example of system operation for new email messages. At 600, a new email message is received in the user's inbox. At 605, the multi-mode communication module 300 determines whether the email address is stored on the data processing device 110 or service 100 (e.g., in the user's address book). If no, then the process terminates. If so, then at 610, the multi-mode communication module 300 retrieves telephone numbers associated with the sender of the email message. At 615, the multi-mode communication module 300 evaluates presence information to prioritize the telephone numbers. For example, if the email is sent from the user's work email address, then the multi-mode communication module 300 may prioritize the user's work telephone above all others (as described above). At 615, the multi-mode communication module 300 generates a new email message dialog containing the highest priority telephone number(s). In one embodiment, a single "callback" button is provided for a single telephone number, thereby allowing the user to easily call back the sender by selecting a specified key on the data processing device 110. This type of operation may be particularly useful for situations where the user is operating the device with only one hand (e.g., while driving a car).

Figure 3B:
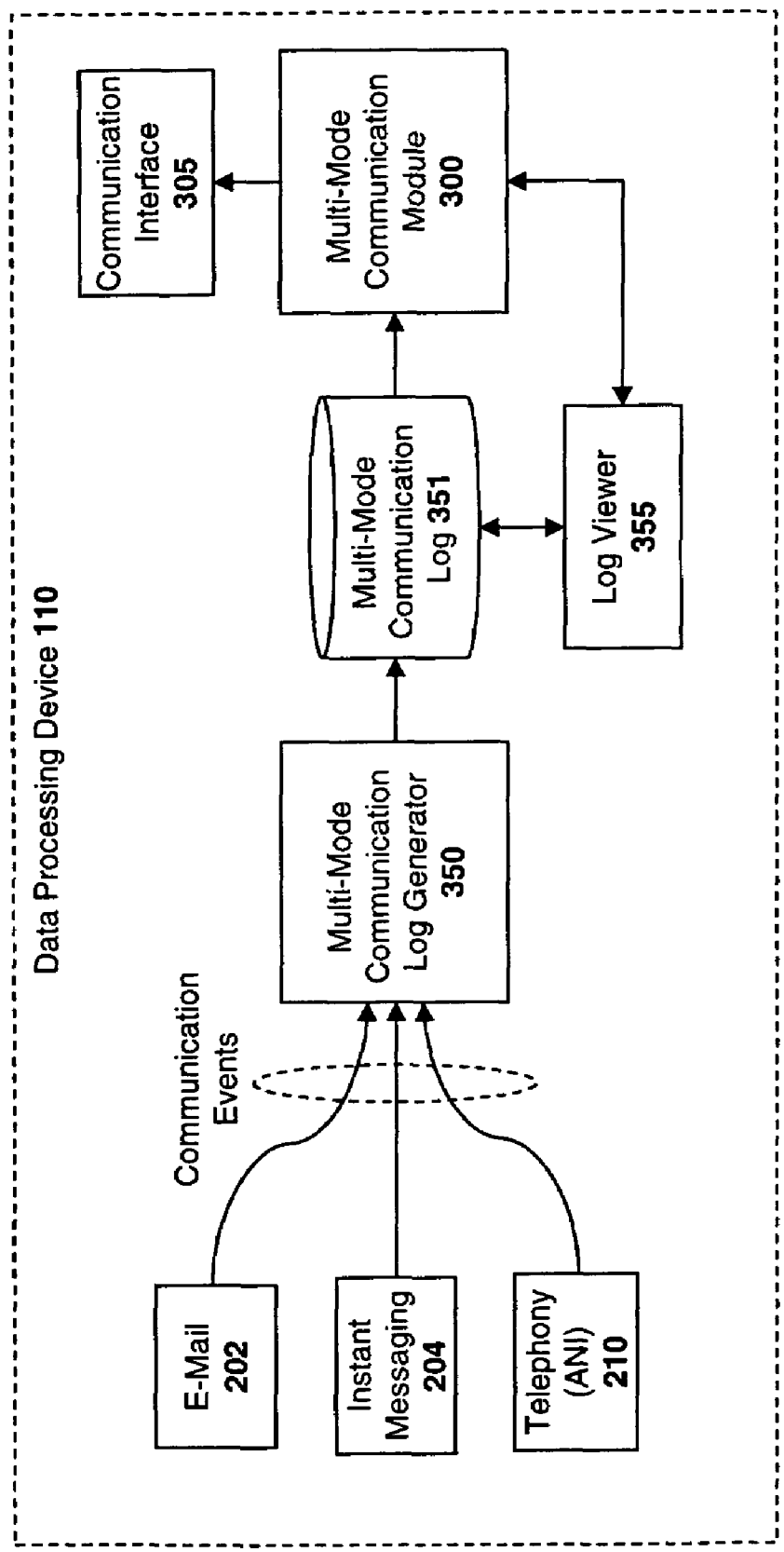
FIG. 3b illustrates a multi-mode communication log according to one embodiment of the invention.

As illustrated in FIG. 3*b*, one embodiment of the invention employs a multi-mode communication log generator 350 for generating a multi-mode communication log 351 in response to various different communication events (e.g., new email messages, new incoming voice calls, new instant messages, . . . etc). Thus, Unlike the call logs available on most mobile phones today, the multi-mode call log 351 includes a list of all recent communication events including, for example, sent/received email messages, instant messaging conversations, MMS messages, SMS messages, incoming/outgoing voice calls and voice messages. In one embodiment, a multi-mode log viewer 355. is provided to allow the end-user to review the entries in the multi-mode log 351. In one embodiment, the user may click on any of the communication events within the log and, in response, the multi-mode communication module 300 will generate a multi-mode interface 305 (e.g., such as the communication menu 400 illustrated in FIG. 4*b*) containing a variety of contact options for the sender of the logged communication event.

In one embodiment, in response to the user selecting a particular calendar entry from the electronic calendar application 206, the multi-mode communication module 300 will generate a multi-mode communication menu 400 such as the one illustrated in FIG. 4*b*. Specifically, in one embodiment, the multi-mode communication menu 400 will contain a list of options for communicating with the meeting owner and/or all of the meeting attendees. A similar menu may also be generated from within the to-do list or tasks application. For example, the multi-mode communication menu 400 may contain a list of options for initiating communication with the person or persons who are assigned a particular task.

System and Method For Dynamically Managing Presence and Contact Information

As used herein, "presence" information refers to any information describing the status of a user with respect to one or more different communication channels. As mentioned above, instant messaging systems provide an indication of different types of presence information (e.g., "User X is Idle").

Figure 7:
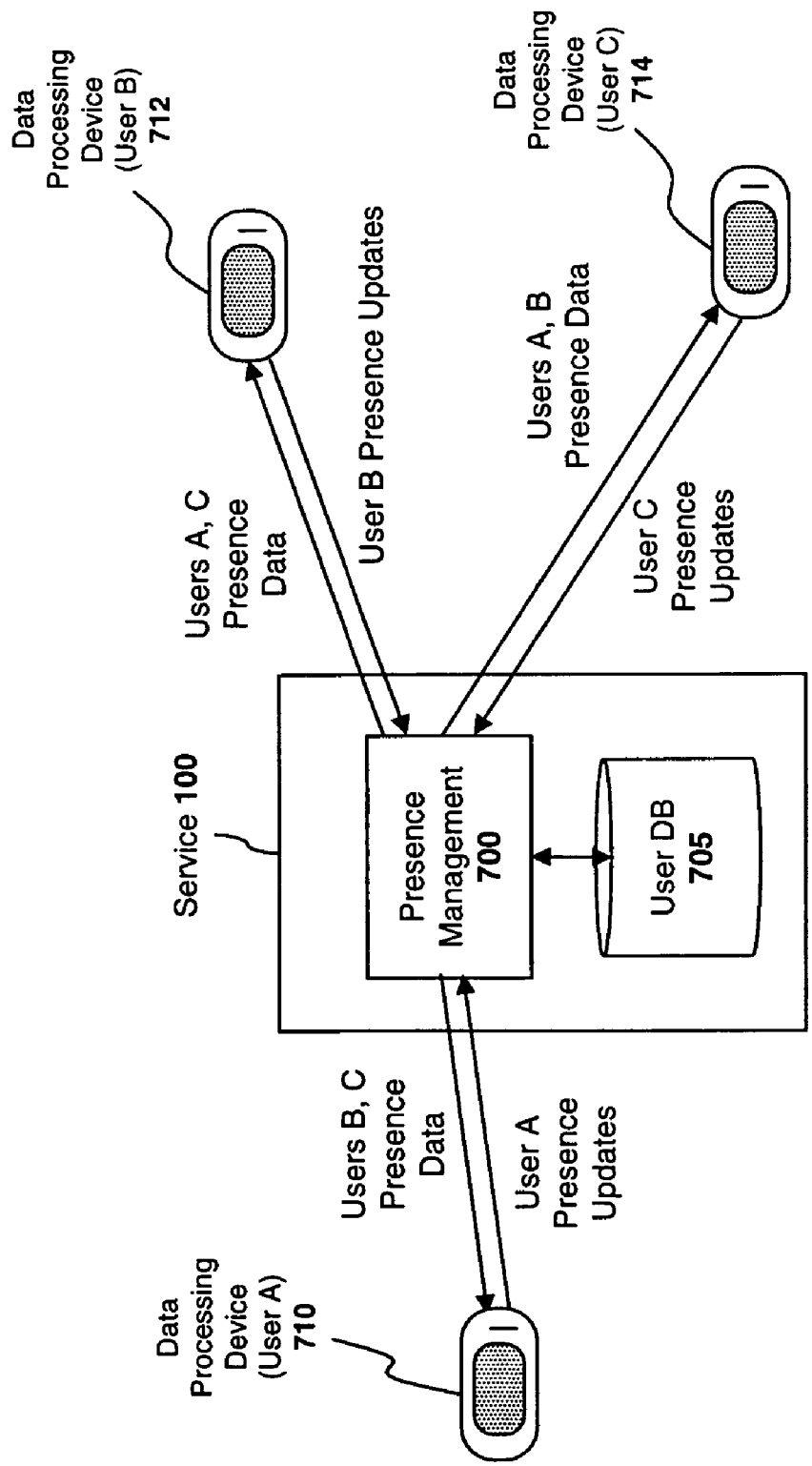
FIG. 7 illustrates one embodiment of a system for managing contact information for multiple users.

In addition to managing presence information for instant messaging sessions, one embodiment of the invention manages presence information for a variety of other communication channels. Specifically, as illustrated in FIG. 7 one embodiment of the service 100 includes a presence management module 700 for managing presence information associated with each user. Three different data processing devices 710, 712 and 714 illustrated in FIG. 7 are associated with three different users—"User A," "User B" and "User C," respectively. In one embodiment, the data processing devices are multi-function wireless devices which support standard voice telephony communication and electronic messaging communication (e.g., email, instant messaging, SMS, MMS, . . . etc).

In operation, the service 100 continually maintains up-to-date presence information for each user within a user database 705, and provides the presence information to other users upon request. In one embodiment, the presence information identifies all communication channels which are currently available for communicating with the user. The availability of the different communication channels may be automatically detected by the presence management module 700. For example, if User A is currently out of range of the wireless network, the presence management module 700 may update User A's presence information to indicate that User A is no longer available for real time communication channels such as instant messaging or voice telephony. As such, if User B and/or User C subscribes to User A's presence information, then upon checking the current status of User A, User B and/or User C will see that User A is unavailable for real time communication. As such, Users B and C may choose to send User A an email message instead of calling User A and being automatically transferred to voicemail.

In one embodiment, the presence management module 700 provides users with a prioritized list of available communication channels in the form of a context-based communication menu 400 such as that illustrated in FIG. 4. For example, if User A is out of range of the wireless network as described above, then, the presence management module may prioritize the non-real-time communication channels such as email or voicemail above the real time communication channels such as instant messaging and voice telephony. Conversely, if User A is within range of the network, then the presence management module 700 may prioritize real time communication channels above non-real-time communication channels.

In addition to, or in lieu or, automatic presence updates as described above, in one embodiment, the presence information maintained by the presence management module 700 is programmable by each end user. For example, during a meeting, User A may wish to disable the telephony capabilities of the data processing device 710 and, instead, rely on instant messaging, SMS and/or email for communicating with Users B and C. Accordingly, User A may configure the presence management module 700 to indicate to Users B and C that the only communication channels available during the meeting are instant messaging, SMS and/or email.

Figure 8:
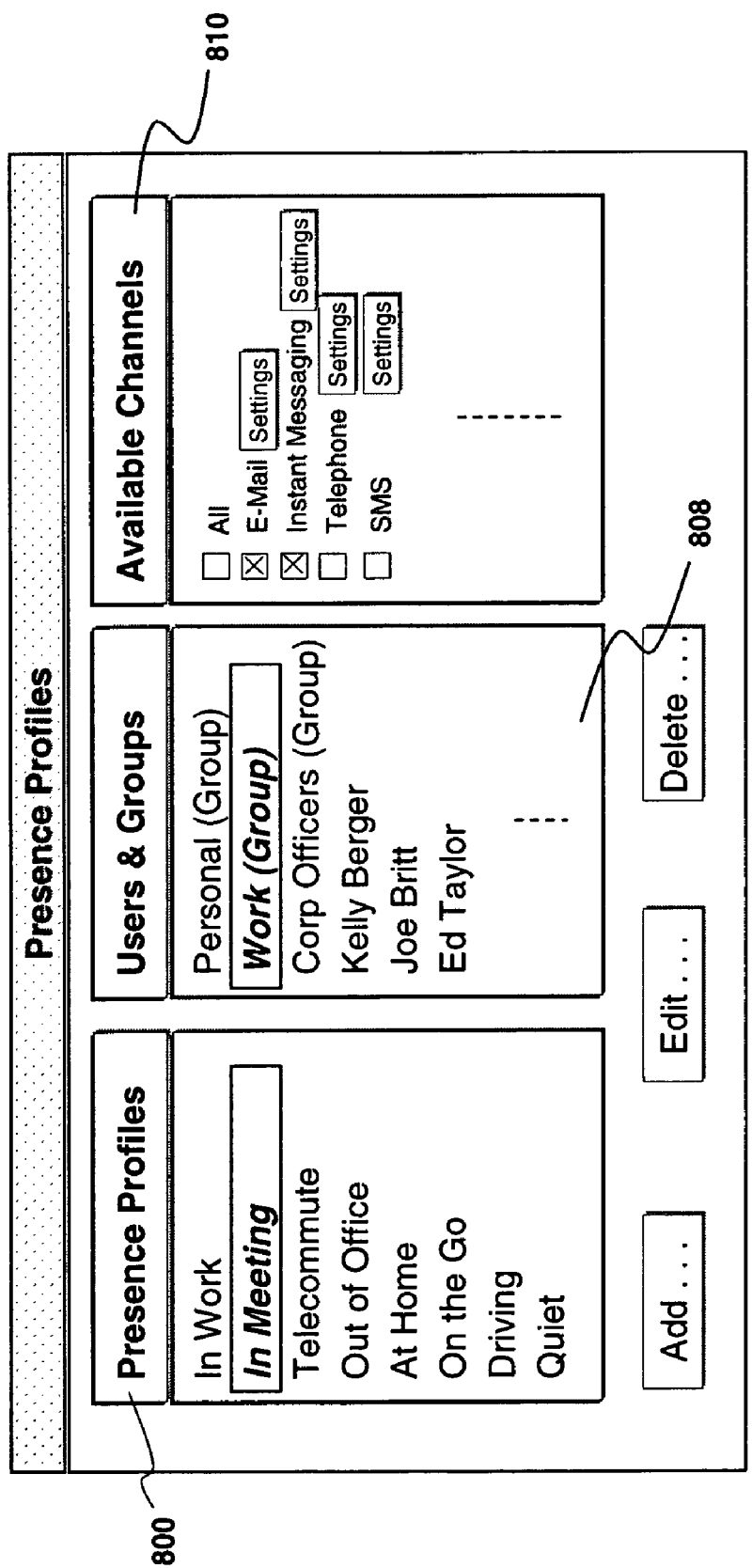
FIG. 8 illustrates one embodiment of an interface for entering different presence profiles.

As illustrated in FIG. 8, in one embodiment, users may define a list of "presence profiles" 800. Each presence profile 800 includes a list of the communication channels 810 made available to specified users or predefined groups of users 808. Returning to the previous example, User A may define a presence profile for attending a meeting (e.g., identified as "In Meeting" in FIG. 8) and may indicate that, during the meeting, the only communication channels which should be made available to other users are instant messaging and email. In addition, as illustrated, User A may indicate available communication channels on a user-by-user or group-by-group basis. For example, User A may indicate that Personal users (i.e., users included within User A's "Personal" group) should be provided all available communication channels during a meeting whereas all other user should be provided with only instant messaging and email. Various additional presence profiles, groupings of users and/or associated communication channels may be defined while still complying with the underlying principles of the invention.

Other exemplary presence profiles illustrated in FIG. 8 include "Work", "Telecommute", "Out of Office", "Home", "On the Go", "Driving", "Quiet." For each profile, there are settings for the preferred communication mode for each category of contacts in the address book. By way of example, the Work profile may specify that business contacts should communicate with the user via the user's work number, work IM name and/or work email address, whereas personal contacts should communicate with the user's personal email address. For the Home profile, the user's business contacts may see a voice mail indicator while the user's personal contacts see that the user is available at his/her home phone number. For the Driving profile, the user may choose to set his/her IM status as offline and ask all contacts to call the user's mobile telephone number. In the Quiet profile, the user may specify that he/she is not available for a phone call but is available for instant messaging. Accordingly, in one embodiment, when the Quiet profile is active, all incoming calls are routed immediately into voice mail and the missed call dialog is displayed. The foregoing examples are used for the purpose of explanation only and should not be read to limit the scope of the invention. A virtually unlimited number of different presence profiles may be defined while still complying with the underlying principles of the invention.

In one embodiment, the presence management module 700 is configured to switch between different presence profiles either manually (e.g., in response to manual requests by the user) or automatically, in response to defined triggering events. In one embodiment, different presence profiles are triggered based on a specified time of day and/or day of the week. For example, the presence management module 700 may trigger User A's "Work" presence profile at 8:30 AM every morning and User A's "Home" presence profile at 5:00 PM every evening (i.e., assuming that User A typically arrives at work by 8:30 AM and leaves work at 5:00 PM).

In one embodiment, the calendar program 206 is configured to communicate with the presence management module 700 (e.g., via interface 200) to activate different presence profiles based on stored calendar events. For example, each calendar entry may include an option for selecting a specific presence profile. Once a particular presence profile is selected for a calendar entry, the presence management module 700 will trigger that profile during the date and time of the calendar entry.

Each user may define a set of all other users who are permitted to subscribe to their presence information. For example, User A may explicitly permit User B and User C to subscribe to his/her presence information but exclude all other users. As a result, the presence management module 700 will only provide presence information to Users B and C.

The presence management module 700 may not merely store the presence information within the user database 705 on the service 100. Rather, in one embodiment, the presence management module 700 actively updates the presence information on each of the data processing devices 710, 712, and 714 in response to changes in a user's presence. For example, when User A's presence changes, the presence management module 700 dynamically transmits presence updates to User B and User C. The presence information will then be readily available on User B's and User C's data processing devices 712, and 714, respectively, when User B or user C attempts to contact User A. In one embodiment, the presence information is linked to different contacts within each user's address book 208 and may be stored within the address book application 208 itself.

It should be noted that a central service 100 such as illustrated in FIG. 7 is not required for complying with the underlying principles of the invention. For example, in one embodiment, data processing devices may exchange presence information directly with one another (e.g., on a peer-to-peer basis).

In addition, various types of information other than presence information may automatically be transmitted to users. For example, if User A's blog or online photo album has been updated, then the presence management module 700 may automatically send a message to all users who have access to User A's presence information (e.g., User B and User C). The message may indicate that new information is available. Alternatively, the presence management module 700 may send the blog posts or the new photos directly to the User B's and/or User C's user's devices, 712 or 714, respectively, directly (e.g., using a designated push mechanism such as MMS or email).

Location information allows the user to switch profiles automatically. You can set your current location to a certain profile, and when your device enters that location the user's profile is switched. For example, when you are at work you can set your current location to the Work profile. Then your profile will switch to Work when you come within proximity of the office. This could be enabled with using the cell ID information that is available from the radio since the software doesn't need to know the physical location of the device.

In one embodiment, as soon as a user modifies his/her contact information, the presence management module 700 will automatically update the contact information on other user's data processing devices. For example, if User A's home phone number changes, then this change will automatically be transmitted from the presence management module 700 and updated within User B's and/or User C's address book (i.e., assuming that User B and User C subscribe to User A's presence and/or contact information). Likewise, if User B's or C's contact information changes, then the changes will automatically be reflected in User A's address book.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, multi-purpose telephony/data processing devices are particularly suitable for implementing certain aspects of the invention because these devices can initiate communication over a variety of communication channels (e.g., voice, IM, email, SMS, MMS, . . . etc). However, the underlying principles are not limited to these types of devices. For example, the underlying principles of the invention may be implemented within standard personal computer configurations standard wireless telephones, and/or other types of communication devices (e.g., vehicle communication devices). Moreover, although the invention was described in the context of specific types of messaging applications (e.g., email, instant messaging, . . . etc), the underlying principles of the invention are not limited to any particular type of messaging application.

In fact, by employing embodiments of the invention described above, all communication devices may be provided with a "contact me here" button that allows the user to set that device as the preferred communication channel. For telephony devices, in contrast to the "do not disturb" button found on most office phones, a "Set as Preferred Phone Number" button may be provided. When a user sits down at his/her desk and selects this button, the telephony device communicates with the presence management module 700 to change the preferred number to the office number. Similarly, when the user gets in his/her car and start the engine, the built-in automobile communication system changes the preferred voice contact number to the car's telephone number. Similarly, the IP telephone integrated within the user's PC may automatically set the preferred contact number to the PC's telephone number when the user logs in. In addition, the user's IM client application may automatically set the user's preferred IM contact when logs in to an IM session. Numerous additional communication applications are considered to be within the scope of the present invention.

Accordingly, the scope and spirit of the invention should be judged in terms of the claims which follow.

What is claimed is:

1. A method implemented on a data processing device comprising:

initiating a first presence profile based on a preferred communication mode, the first presence profile including a first list of communication channels made available for use by multiple devices;

automatically switching to a second presence profile in response to a defined triggering event, the second presence profile including a second list of communication channels made available for use by the multiple devices, the first list and the second list of communication channels configured to be displayable on the multiple devices, wherein the displayable first list of communication channels is different for at least two of the multiple devices, wherein the displayable second list of communication channels is different for at least two of the multiple devices, and wherein the second list of communication channels made available for use by the multiple devices does not include a telephone communication channel; and automatically transmitting the second list of communication channels to the multiple devices to update the multiple devices with the second presence profile in response to the defined triggering event, wherein a received communication that is received at one of the multiple devices using the telephone communication channel is automatically routed to a voicemail channel and a missed call dialog is displayed.

2. The method of claim 1, wherein the defined triggering event is the data processing device entering a proximity of a location associated with the second presence profile.

3. The method of claim 1, wherein the defined triggering event is a specific time of day.

4. The method of claim 1, wherein the defined triggering event is a stored calendar event.

5. The method of claim 1, wherein the defined triggering event is a specific time on a specific day of a week.

6. A data processing device comprising:

a processor; and one or more computer-readable media having instructions stored thereon that, when executed by the processor, initiate the data processing device to:

initiate a first presence profile based on a preferred communication mode, the first presence profile including a first list of communication channels made available for use by multiple devices;

automatically switch to a second presence profile in response to a defined triggering event, the second presence profile including a second list of communication channels made available for use by the multiple devices, the first list and the second list of communication channels configured to be displayable on the multiple devices, wherein the displayable first list of communication channels is different for at least two of the multiple devices, wherein the displayable second list of communication channels is different for at least two of the multiple devices, and wherein the second list of communication channels made available for use by the multiple devices does not include a telephone communication channel; and automatically transmit the second list of communication channels to the multiple devices to update the multiple devices with the second presence profile in response to the defined triggering event, wherein a received communication that is received at one of the multiple devices using the telephone communication channel is automatically routed to a voicemail channel and a missed call dialog is displayed.

7. The data processing device of claim 6, wherein the defined triggering event is the data processing device entering a proximity of a location associated with the second presence profile.

8. The data processing device of claim 6, wherein the defined triggering event is a specific time of day.

9. The data processing device of claim 6, wherein the defined triggering event is a stored calendar event.

10. The data processing device of claim 6, wherein the defined triggering event is a specific time on a specific day of a week.

11. One or more computer-readable storage media having instructions stored thereon that, when executed by a processor, initiate a data processing device to:

initiate a first presence profile based on a preferred communication mode, the first presence profile including a first list of communication channels made available for use by multiple devices;

automatically switch to a second presence profile in response to a defined triggering event, the second presence profile including a second list of communication channels made available for use by the multiple devices, the first list and the second list of communication channels configured to be displayable on the one or more devices, wherein the displayable first list of communication channels is different for at least two of the multiple devices, wherein the displayable second list of communication channels is different for at least two of the multiple devices, and wherein the second list of communication channels made available for use by the multiple devices does not include a telephone communication channel; and automatically transmit the second list of communication channels to the multiple devices to update the multiple devices with the second presence profile in response to the defined triggering event, wherein a received communication that is received at one of the multiple devices using the telephone communication channel is automatically routed to a voicemail channel and a missed call dialog is displayed.

12. The one or more computer-readable storage media of claim 11, wherein the defined triggering event is a data processing device entering a proximity of a location associated with the second presence profile.

13. The one or more computer-readable storage media of claim 11, wherein the defined triggering event is a specific time of day.

14. The one or more computer-readable storage media of claim 11, wherein the defined triggering event is a stored calendar event.

15. The one or more computer-readable storage media of claim 11, wherein the defined triggering event is a specific time on a specific day of a week.

* * * * *